ELLIOT B. FITCH
ELLIOTT J. ROBERTS
WILLIAM C. WEBER
INVENTORS.

ATTORNEY.

United States Patent Office 3,552,918
Patented Jan. 5, 1971

3,552,918
PROCESS FOR THE PRODUCTION OF
PHOSPHORIC ACID
Elliot B. Fitch, Weston, and Elliott J. Roberts, Westport,
Conn., and William C. Weber, London, England, assignors to Dorr-Oliver Incorporated, Stamford, Conn.,
a corporation of Delaware
Filed Nov. 8, 1966, Ser. No. 592,776
Int. Cl. C01b 25/22
U.S. Cl. 23—165                                    7 Claims

ABSTRACT OF THE DISCLOSURE

Process for producing high strength phosphoric acid having a $P_2O_5$ content from about 37% to 45% by acidulating phosphate rock in two zones under conditions such that the calcium sulphate is initially precipitated as the semi-hydrate. In the first zone, the rock is reacted with an acid medium containing insufficient sulphuric acid for stoichiometric reaction with the available calcium in the rock but sufficient to produce a slurry of calcium sulphate semi-hydrate suspended in phosphoric acid and containing dissolved monocalcium phosphate. Thereafter, the resulting slurry is transferred to a second zone containing a sulphate concentration in excess of the amount required to precipitate all the monocalcium phosphate as calcium sulphate semi-hydrate. A portion of the slurry from said second zone is recycled to said first zone as acidulating medium.

---

Figure 1:
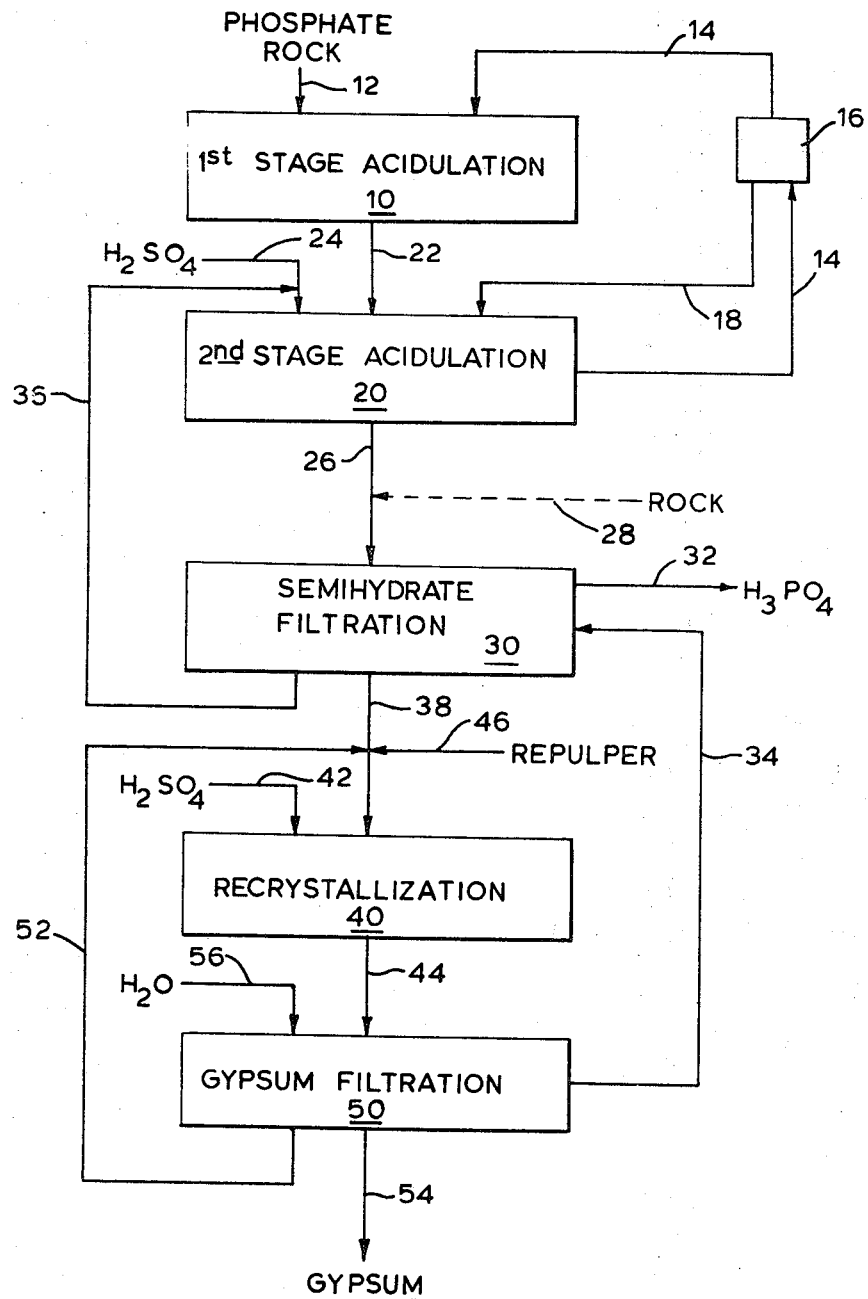

This invention relates to improvements in the process of producing phosphoric acid by the acidulation of phosphate rock with sulphuric acid and more particularly to a process of producing a high strength acid in which the calcium sulphate is precipitated as the semi-hydrate in a readily filterable form.

The production of phosphoric acid by the acidulation of phosphate rock with sulphuric acid is a well-known industrial process.

Generally, ground phosphate rock is treated with sulphuric acid producing solid calcium sulphate in phosphoric acid liquor. Since, in most instances, the calcium sulphate must be separated from the liquor, it is essential to control reaction conditions so that the precipitated calcium sulphate is in a form amenable to separation. Depending on the conditions maintained during the digestion operation, the calcium sulphate may be precipitated as the dihydrate $CaSO_4, 2H_2O$, semi-hydrate $CaSO_4, \frac{1}{2}H_2O$ or anhydrite $CaSO_4$.

Heretofore it has generally been the practice to maintain conditions such that only the dihydrate is formed because of the relative ease of filtering and washing the precipitate from the resulting acid. However, since gypsum is stable only in relatively weak acid the concentration of the phosphoric acid produced could not exceed 32% $P_2O_5$ without encountering serious operating difficulties.

With increased demands for higher strength acid by fertilizer manufacturers, attempts have been made to develop processes in which the calcium sulphate is precipitated as the semi-hydrate thus permitting producing acid having a $P_2O_5$ content as high as about 50%.

It has been proposed to acidulate phosphate rock with a mixture of concentrated phosphoric acid and sulphuric acid to produce an acid having a $P_2O_5$ content of about 45% and a calcium sulphate semi-hydrate which is thereafter separated from the acid by filtration.

While this process produces a high strength acid it has not been commercially successful primarily because of the difficulty experienced with the filtration of the calcium sulphate semi-hydrate. It was found that the calcium sulphate semi-hydrate thus produced not only exhibited a poor filtration rate but also the semi-hydrate crystals blinded the filter cloth eventually resulting in the complete shut-down of the filtering operation.

It is therefore an object of the present invention to provide a process for producing high strength phosphoric acid while also producing readily filterable semi-hydrate crystals.

Another and equally important process consideration in phosphoric acid manufacturing, from a commercial point of view, is the recovery of all the phosphate value in the rock as well as the recovery of the produced acid associated with the precipitated calcium sulphate.

Generally, in phosphoric acid manufacturing there are three types of $P_2O_5$ losses which must be minimized in order to have an efficient and economical plant. One type of loss is in the undissolved or unextracted $P_2O_5$ in the phosphate rock which is reported as "citrate insoluble $P_2O_5$." It is affected by the fineness of grind, reaction time, intensity of agitation and especially the amount of sulphate ions in the reaction slurry. Thus when phosphate rock is digested in acid high in sulphuric acid the rock becomes coated with a precipitate of calcium sulphate which prevents further digestion of the rock.

The second loss is in the form of water soluble $P_2O_5$ not removed from the $CaSO_4$ filter cake. This is affected by the quality of the $CaSO_4$ precipitate produced in the reaction system and the use of the maximum possible quantity of wash water.

The third type of loss is the water insoluble $P_2O_5$ in the calcium sulphate reported as "citrate soluble $P_2O_5$." When the calcium sulphate is precipitated from a phosphoric acid solution, it carries with it certain amounts of $P_2O_5$, probably as dicalcium phosphate, in the crystal structure of the calcium sulphate whether it be the dihydrate, semi-hydrate or anhydrite. The extent of this loss is proportional to the strength of the phosphoric acid in the system and inversely proportional to the amount of sulphate ion in the acid.

Thus, as it is well understood in the art, reaction conditions which favor or are effective for increasing $P_2O_5$ recovery in one aspect of the process are detrimental or incompatible with reaction conditions which favor $P_2O_5$ recovery in another aspect of the process. For example, therefore, as will be seen from the foregoing conditions which reduce citrate soluble losses increase citrate insoluble losses. While conditions which are effective to produce concentrated phosphoric acid are incompatible with conditions for producing the generally acceptable gypsum crystals or with conditions for reducing water soluble $P_2O_5$ losses.

Accordingly, it is another object of the present invention to provide a process for producing high strength phosphoric acid by the acidulation of phosphate rock in which the difficulties of the prior art are avoided.

It is still another object of the invention to provide a process for producing high strength acid while improving $P_2O_5$ recovery.

A further object of the invention is to provide a process in which the maximum conversion of the phosphate values in the rock are attained while obtaining readily filterable and washable crystals.

These and other objects and advantages of the invention are attainable by the present invention which is predicated on finding that in the production of high strength acid, readily filterable calcium sulphate semi-hydrate crystals are obtained by acidulating phosphate rock at sufficiently high temperatures in successive stages or zones the first of which contains insufficient sulphuric acid for stoichiometric reaction with the available calcium in the rock but sufficient to produce a slurry of calcium sulphate semi-hydrate suspended in phosphoric acid and containing dissolved monocalcium phosphate and thereafter treating the resulting slurry in a subsequent zone containing sulphate ions in excess of the amount required to react with all the available calcium formed.

While applicants do not wish to be limited to the following explanation, it is believed that the excess sulphate ions in the second treatment zone acts as a flocculating agent causing the fine semi-hydrate to come close enough so that the additional $CaSO_4 \cdot \frac{1}{2} H_2O$ being precipitated will cement them together. It has therefore been observed that when acidulating phosphate rock under the conditions heretofore proposed, calcium sulphate is precipitated as individual fine crystals. However, if these crystals are transferred to a zone of high sulphate concentration or the calcium sulphate precipitated in a zone of high sulphate concentration, twinned or agglomerated crystals are formed yielding large aggregates which can be readily filtered and washed. However, too extensive agglomeration is to be avoided since very large aggregates would have internal voids which might be difficult to wash.

Thus, in one instance, it was found that improved filtration rates were obtained when the phosphate rock was initially acidulated in a first zone containing an amount of sulphuric acid such that in the resulting slurry, from about 1% to about 4.5% excess calcium, reported as CaO, was in solution.

Thereafter, the slurry was transferred to a second acidulation zone in which an excess amount of sulphuric acid was added so that the sulphate concentration in said zone was between about 3% to about 6%.

In both zones the temperature was maintained in the range to ensure the formation of the semi-hydrate. Thus, for example, when acidulating rock with phosphoric acid having a $P_2O_5$ content in the range of about 37% to 45%, the optimum temperature was found to be in the range from about 80° to 95° C.

Therefore, according to one aspect of the invention, there is provided a process of producing high strength acid in which the phosphate rock is initially acidulated with concentrated acid containing a deficiency of sulphuric acid thus forming a slurry of calcium sulphate semi-hydrate suspended in phosphoric and containing dissolved monocalcium phosphate; thereafter the resulting slurry is subjected to further acidulation in a subsequent zone containing sulphate ions in excess of the amount stoichiometrically sufficient to precipitate all the available calcium as calcium sulphate in a readily filterable form and phosphoric acid having the desired $P_2O_5$ content.

In another aspect of the invention, there is provided a process of producing high strength acid and gypsum wherein the phosphate rock is initially acidulated with a slurry, containing calcium sulphate semi-hydrate, phosphoric acid having a $P_2O_5$ content from about 37% to 45% and sulphuric acid, preferably the slurry resulting from a prior acidulating reaction, in amounts insufficient for stoichiometric reaction with the available calcium in said rock but sufficient to form calcium sulphate semi-hydrate suspended in phosphoric acid and containing dissolved monocalcium phosphate; subjecting the thus formed slurry to further acidulation in a subsequent zone containing sulphate ions in excess of the amount sufficient to precipitate substantially all the monocalcium phosphate as calcium sulphate semi-hydrate and to produce phosphoric acid having the desired $P_2O_5$ content; separating the thus produced acid from the semi-hydrate precipitate, resuspending the separated semi-hydrate in dilute acid to recrystallize the calcium semi-hydrate as gypsum, and separating the thus formed gypsum with sufficient washing to recover $P_2O_5$ associated therewith.

Figure 2:
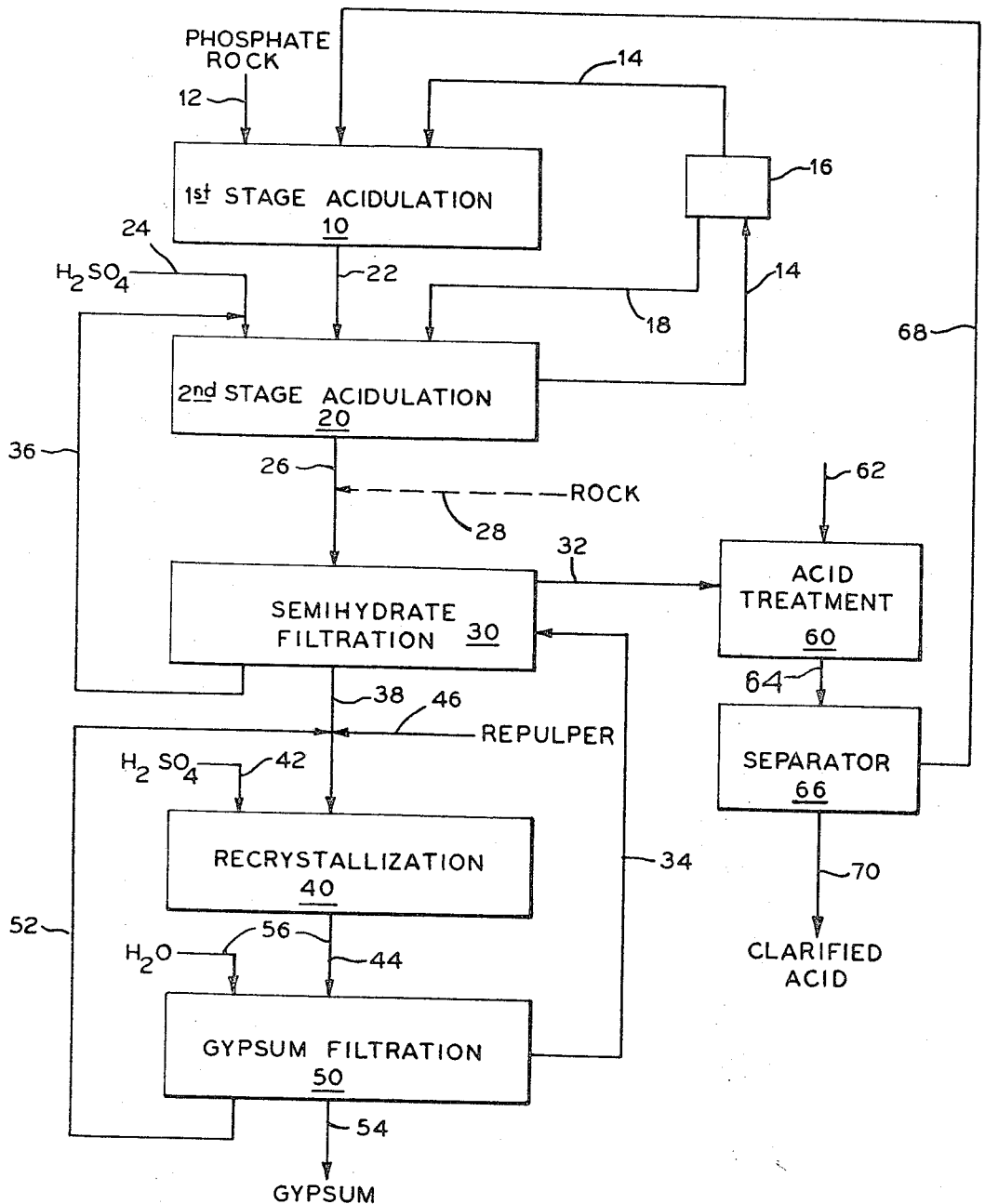

The invention will be more fully understood by reference to the accompanying drawings in which FIG. 1 is a diagrammatic flow sheet of the preferred embodiment for carrying out the process of the invention. FIG. 2 is a modified form thereof showing additional treatment of the recovered phosphoric acid.

Referring now to the drawings and particularly to FIG. 1 it will be seen that in the preferred embodiment the flow sheet comprises:

(a) A first acidulation zone or compartment 10 wherein phosphate rock is initially acidulated or digested with concentrated acid at sufficiently high temperatures to form a slurry of calcium sulphate semi-hydrate suspended in phosphoric acid and containing monocalcium phosphate.

(b) A second acidulation zone or comparement 20 wherein the CaO dissolved in compartment 10 is precipitated by the reaction with sulphuric acid in the presence of a sufficient concentration of excess sulphate ions to promote the agglomeration of the semi-hydrate crystals whereupon the new semi-hydrate precipitated by the reaction of the sulphuric acid and the dissolved CaO cements the individual small semi-hydrate crystals into larger agglomerates.

(c) A filtration station 30 for separating the semi-hydrate from the thus produced phosphoric acid, (d) A crystallization zone or compartment 40 in which the semi-hydrate filter cake from filter 30 is resuspended and recrystallized into the gypsum form and (e) A final filtration station 50 for separating and washing the thus converted gypsum for $P_2O_5$ recovery.

While we have shown individual compartments for zones 10, 20 and 40, it is to be understood that in the preferred embodiment each zone may comprise a series of interconnected reaction tanks, each having suitable agitating means and pump means.

More in detail, ground phosphate rock having a particle size from about —20 mesh to about —65 mesh, depending on origin of the rock, is continuously fed into zone 10 via line 12 wherein it is acidulated by a mixture of concentrated phosphoric acid and sulphuric acid preferably the acid in the slurry recirculated from zone 20 via line 14. As shown the acid containing slurry is cooled prior to its introduction into zone 10, such as in cooler 16, to be more fully described hereinafter.

The concentration of the phosphoric acid introduced into zone 10 is in the range from about 38% to 45% $P_2O_5$ while the concentration or the amount of the sulphuric acid is controlled so as to maintain in said zone a deficiency of sulphate ions, expressed as excess CaO in solution, preferably in the range from about 1% to about 4.5%.

In zone 10 the reaction conditions are maintained such that the phosphate rock is initially digested to produce a slurry of calcium sulphate semi-hydrate suspended in phosphoric acid and containing monocalcium phosphate.

The resulting slurry is transferred via line 22 to zone 20 along with sufficient sulphuric acid through line 24 to precipitate all the remaining calcium as calcium sulphate semi-hydrate and to produce a phosphoric acid having a $P_2O_5$ content from about 37% to 45%. The amount of sulphuric acid added to zone 20 should be sufficient to maintain the total sulphate concentration in zone 20 in the range from about 3% to about 6%, expressed as $SO_4$, depending on the type of rock being treated.

As heretofore noted, the presence of sufficient sulphate ions essentially acts as a flocculating agent to group the existing crystals of calcium sulphate semi-hydrate in clusters tight enough that the currently precipitating semi-hydrate can manage to cement them together firmly in a composite crystal structure or agglomerate. These agglomerates filter and wash much better than the individual crystals.

Furthermore, to insure the precipitation of the calcium sulphate as the semi-hydrate the temperature of the reaction mass must be maintained within a certain range. In accordance with this invention, the temperature of the slurry, both in zones 10 and 20 is maintained at a temperature in excess of 80° but not to exceed 110° C. and preferably in the range from about 80° to 95° C., by continuously circulating a portion of the slurry produced in zone 20 to cooler 16 which is preferably a vacuum type cooler, provided with a condenser and vacuum system, which is well known in the art.

From cooler 16 a controlled portion of the cooled slurry is continuously circulated to zone 10 wherein the acid in the slurry dissolves the phosphate rock as heretofore described while the remaining portion of the cooled slurry is returned via line 18 to zone 20 thereby maintaining said zone within the aforesaid temperature range.

The dissipation of the excess heat of reaction from zones 10 and 20 is preferably done by evaporative cooling of slurry recirculated out of 20 with a controlled amount of the cooled slurry going to zone 10 via line 14 and the rest returning to zone 20 via line 18. However each zone may have its own cooler and a separate pump used to circulate the correct amount of slurry from 20 to 10. Another alternative is to do all of the cooling on zone 10.

Another portion of the resultant slurry, preferably from zone 20, flows via line 26 to a filtration station 30, which is preferably a vacuum filter wherein the semi-hydrate is separated from the product acid. The strong phosphoric acid having a concentration of about 38% to 45% $P_2O_5$ is withdrawn via line 32 and goes to storage or to further treatment for sulphate correction and clarification to be described hereinafter.

The cake on filter 30 is washed with phosphoric acid of a concentration from about 18% to 25% $P_2O_5$ preferably the filtrate acid formed in filtration station 50, and recycled via line 34. The weak filtrate resulting from the washing on filter 30 is returned to the acidulation compartment via line 36 and preferably used to dilute the sulphuric acid introduced into the second acidulation zone 20.

The washed semi-hydrate filter cake coming from filter 30 via line 38 is preferably repulped, diagrammatically indicated by line 46, and thereafter introduced into the recrystallization zone 40. As shown, the semi-hydrate cake from filter 30 is repulped with weak phosphoric acid filtrate coming from filter section 50 and recycled via line 52.

As previously indicated the recrystallizing reactor 40 may also comprise a series of individual reactors each provided with agitating means and cooler, not shown, similar to cooler 16 heretofore described.

In zone 40 the slurry is maintained at a temperature in the range from about 50° to 70° C. and at acid concentrations to convert the semi-hydrate to gypsum which is thereafter pumped via line 44 to gypsum filtration section 50 which preferably is also of the vacuum type. If desired additional sulphuric acid may be added to zone 40 such as via line 42.

As previously indicated, the initial filtrate obtained in forming the gypsum filter cake on filter 50 is recirculated via line 34 as wash liquor to the semi-hydrate filter 30 as heretofore described. Thereafter, the gypsum cake is thoroughly washed with water, introduced via line 56 to recover as much of the $P_2O_5$ precipitated with the gypsum as economically feasible and the filtrate thus obtained used for repulping the semi-hydrate filter cake at line 38.

The washed and dewatered gypsum filter cake is recovered at line 54 and conveyed to waste or recovery.

In some cases it may be desirable to reduce the sulphate ion concentration of the slurry coming from zone 20 prior to filtration on filter 30. This may be accomplished by providing a third reaction stage shown here by line 28 immediately prior to filtration station 30 into which a small amount of phosphate rock is added.

While it is possible to thus reduce the sulphate content of the slurry, unless close control is maintained over the amount of phosphate rock added at this point the sulphate content of the slurry may be reduced to the extent that fine crystalline semi-hydrate is precipitated which will reduce the filtration rate on filter 30.

Therefore, in accordance with this invention, it is preferred to reduce the sulphate content by adding the phosphate rock to the filtered product acid and then clarifying the acid in some separating device.

More particularly, as shown in FIG. 2, produce phosphoric acid recovered via line 32 is pumped to compartment 60 into which is added a controlled quantity of phosphate rock via line 62 to reduce the sulphate content of the acid so as to be in the range from about 0.7% to 2.0%. The resulting slurry is thereafter pumped via line 64 into a separating device 66 which may be a centrifuge, wherein any unreacted rock and/or the precipitated calcium sulphate is separated and preferably returned via line 68 to the initial acidulation zone 10 while clarified phosphoric acid low in sulphate ion concentration is recovered via line 70.

The optimum operating conditions of the process have been given above. In general, temperatures of at least 80° C. must be maintained in the system to precipitate the calcium sulphate as the semi-hydrate. However, as is well known in the art, the required temperature will vary with the concentration of the phosphoric acid used and the maximum allowable temperature will vary with the time the semi-hydrate is held at this temperature. Since at high temperatures the phosphoric acid becomes more corrosive requiring special materials of construction, it is preferred to operate in the range of 80° to 95° C.

In zone 10 we prefer to maintain conditions such that from 1% to 5% excess CaO is maintained in solution. Under these conditions about 50% of the calcium sulphate is precipitated in zone 10 and 50% precipitated in zone 20.

On the other hand, we have found that unless from about 3%, but preferably above 4% to about 6% total sulphate concentration is maintained in zone 20, the aforesaid unexpected results are not attained.

It will be recognized however, that the optimum percent of sulphate ion concentration to be maintained in zone 20 will vary within the aforesaid range depending on the geographic origin of the rock.

Incidentally, excess CaO is defined as the amount of calcium in solution over and above that required to react with all the sulphate ions in solution and analyzed as weight percent CaO.

The invention will be better understood from a consideration of the following example which, however, is not limited thereto:

EXAMPLE

A phosphoric acid plant was operated to test the process. It comprised four agitated reactors in series, having volumetric capacities of 1810, 1362, 1390, and 864 cubic feet respectively. Part of the slurry from the fourth tank was advanced to a filter via a filter feed tank, part was recirculated to the first reactor of the series. Rock, together with weak acid return from subsequent steps of the operation, was also fed into the first reactor. $H_2SO_4$ was fed into the fourth.

Under the following range of conditions well-agglomerated readily-filtering hemihydrate crystals were formed:

Feed rate: 300–400 tons/day, Western phosphate rock ground to 12% plus 100 mesh
Reactor temperature: 82°–88° C.
$SO_4$ level in fourth reactor: 4%–5%
Recirculation rate: 48 c.f.m.
Product acid sp. gravity: 1.5–1.54
Dilution of pulp in reactor: about 2 parts liquid/1 part solids Under these conditions about 50–60° percent of the calcium sulphate was precipitated in the fourth or high sulphate reactor.

With this rock operation of the proces with 3.4% $SO_4$ in the fourth reactor resulted in a hemihydrate which was further filterable. Operation with 4.5% $SO_4$ and substantially higher recirculation rates led to difficulties with rock coating in the first three reactors.

From the foregoing description, it is evident that the objects of this invention together with many practical advantages, are successfully achieved. While the preferred embodiments of our invention have been described, numerous further modifications may be made without departing from the scope of this invention.

We claim:

1. A process for producing phosphoric acid and gypsum by the acidulation of phosphate rock with concentrated acid which comprises; reacting in a first acidulation zone phosphate rock with a mixture of concentrated phosphoric acid and sulphuric acid in amounts to form a slurry of calcium sulphate semi-hydrate suspended in phosphoric acid and containing dissolved monocalcium phosphate to provide from about 1% to about 4.5% excess CaO in solution; transferring the thus formed slurry to a second acidulation zone containing a sulphate concentration in excess of the amount necessary to precipitate substantially all the available calcium as calcium sulphate semi-hydrate and to produce phosphoric acid having a $P_2O_5$ content in excess of 37% maintaining the temperature in said first and second acidulation zones in excess of 80° but below 110° C.; maintaining said sulphate concentration in said second acidulation zone in the range from about 3% to about 6% to produce said semi-hydrate crystals in a form which are sufficiently stable to be filtered and washed but which readily recrystallize to the dihydrate form; controllably recirculating a portion of the slurry from said second acidulation zone containing said excess sulphate concentration to said first acidulation zone to maintain in said last mentioned zone said acid deficiency; subjecting another portion of the slurry from said second acidulation zone to filtration to separate the thus produced acid from the precipitated calcium sulphate semi-hydrate; washing the thus separated calcium sulphate semi-hydrate with dilute phosphoric acid obtained from the subsequent calicum sulfate dihydrate separation step; subjecting the thus separated calcium sulphate semi-hydrate to recrystallization in the presence of dilute acid to convert the calcium sulphate semi-hydrate to calcium sulphate dihydate; separating the thus formed calcium sulphate dihydrate from said dilute acid; and recycling said dilute acid as wash liquor to said calcium sulphate semi-hydrate washing step.

2. Process according to claim 1 wherein the calcium sulphate semi-hydrate separated during filtration is repuped with dilute acid prior to recrystallization to gypsum.

3. Process according to claim 1 wherein the calcium sulphate semi-hydrate slurry from said second acidulation is treated with phosphate rock prior to filtration to reduce the sulphate ion concentration.

4. Process according to claim 1 wherein the temperature in the acidulation zone is maintained in the range from about 80° to about 95° C.

5. Process according to claim 1 wherein the filtered product acid is treated with phosphate rock to reduce the sulphate content of said acid.

6. Process according to claim 5 wherein the treated produce acid is subjected to clarification treatment thus producing a clarified low sulphate acid and sludge comprising mainly calcium sulphate semi-hydrate.

7. Process according to claim 6 wherein the resulting sludge is recirculated to the initial acidulation zone for further treatment.

References Cited
UNITED STATES PATENTS

| | | | |
|---|---|---|---|
| 3,418,077 | 12/1968 | Robinson | 23—165 |
| Re. 19,045 | 1/1937 | Larsson | 23—165 |
| 2,049,032 | 7/1936 | Weber et al. | 23—165 |
| 2,885,264 | 5/1959 | Peet | 23—165 |

FOREIGN PATENTS

| | | | |
|---|---|---|---|
| 718,837 | 9/1965 | Canada | 23—165 |

HERBERT T. CARTER, Primary Examiner

U.S. Cl. X.R.

23—122